United States Patent
Donthi et al.

(10) Patent No.: US 9,179,407 B2
(45) Date of Patent: Nov. 3, 2015

(54) SELECTIVE NOTIFICATION OF DRX PARAMETER

(71) Applicant: Broadcom Corporation, Irvine, CA (US)

(72) Inventors: Sushruth Nagaraj Donthi, Bangalore (IN); Pradeep Seshadri, Bangalore (IN)

(73) Assignee: BROADCOM CORPORATION, Irvine, CA (US)

( * ) Notice: Subject to any disclaimer, the term of this patent is extended or adjusted under 35 U.S.C. 154(b) by 132 days.

(21) Appl. No.: 13/743,218

(22) Filed: Jan. 16, 2013

(65) Prior Publication Data

US 2014/0161007 A1 Jun. 12, 2014

Related U.S. Application Data

(60) Provisional application No. 61/735,483, filed on Dec. 10, 2012.

(51) Int. Cl.
*H04W 52/02* (2009.01)
*H04W 76/04* (2009.01)
*H04W 60/00* (2009.01)

(52) U.S. Cl.
CPC ........ *H04W 52/0216* (2013.01); *H04W 76/048* (2013.01); *H04W 60/00* (2013.01)

(58) Field of Classification Search
USPC ......... 370/252, 311, 328, 331, 350, 335, 305; 455/229, 456.1, 436, 450, 458, 432.1, 455/441, 452.1
See application file for complete search history.

(56) References Cited

U.S. PATENT DOCUMENTS

| | | | |
|---|---|---|---|
| 8,085,694 B2 * | 12/2011 | Wu et al. | 370/305 |
| 8,098,635 B2 * | 1/2012 | Montojo et al. | 370/335 |
| 8,532,599 B2 * | 9/2013 | DiGirolamo et al. | 455/229 |
| 8,634,845 B2 * | 1/2014 | Frost et al. | 455/456.1 |
| 2007/0291673 A1 * | 12/2007 | Demirhan et al. | 370/311 |
| 2010/0130237 A1 * | 5/2010 | Kitazoe et al. | 455/458 |
| 2010/0184443 A1 | 7/2010 | Xu | |
| 2010/0279715 A1 | 11/2010 | Alanara et al. | |

(Continued)

OTHER PUBLICATIONS

Samsung, 3GPP TSG-RAN2 Meeting #59 bis: R2-074223; Measurement in DRX ; Oct. 12, 2007; 3GPP.*

(Continued)

*Primary Examiner* — Benjamin H Elliott, IV
*Assistant Examiner* — Eric Nowlin
(74) *Attorney, Agent, or Firm* — Foley & Lardner LLP; Christopher J. McKenna; Paul M. H. Pua

(57) ABSTRACT

Systems and methods are provided that may reduce unnecessary resource consumption and network traffic in a communications network, such as an LTE network. Initiating a tracking area update (TAU) procedure may be avoided in instances where a discontinuous reception (DRX) cycle length chosen by a user equipment (UE) would be ignored in accordance with standards governing paging in the communications networks. To determine whether or not a TAU should be initiated, three parameters may be considered. A first parameter may be the DRX cycle length that is already configured in a mobility management entity (MME). A second parameter may be a DRX cycle length chosen by the UE that the UE wishes to indicate to the MME. A third parameter may be a DRX cycle length that is broadcast by an evolved Node B serving a cell in which the UE is operating.

20 Claims, 9 Drawing Sheets

(56) References Cited

U.S. PATENT DOCUMENTS

| | | |
|---|---|---|
| 2012/0069782 A1* | 3/2012 | Kuo et al. .................... 370/311 |
| 2012/0250538 A1 | 10/2012 | Su et al. |
| 2012/0252517 A1 | 10/2012 | Karampatsis et al. |
| 2013/0107778 A1* | 5/2013 | Ryu et al. .................... 370/311 |
| 2013/0176873 A1* | 7/2013 | Ji et al. .................... 370/252 |
| 2014/0185475 A1* | 7/2014 | Ji et al. .................... 370/252 |

OTHER PUBLICATIONS

3GPP, 3GPP TS 23.401 V10.6.0; 3rd Generation Partnership Project; Technical Specification Group Services and System Aspects; General Packet Radio Service (GPRS) enhancements for Evolved Universal Terrestrial Radio Access Network (E-UTRAN) access (Release 10); 2011-12; 3GPP; Release 10 Version 10.6.0.*

* cited by examiner

SELECTIVE NOTIFICATION OF DRX PARAMETER

TECHNICAL FIELD

The technical field of the present disclosure relates to wireless communications, and in particular, to selectively initiating a tracking area update (TAU) to update a discontinuous reception (DRX) cycle length parameter.

BACKGROUND

A user equipment (UE), e.g., a cellular telephone operating in a wireless communications network, may have various modes of operation that may include an idle mode and a connected mode. In the idle mode, the UE may power down one or more of its operating components/elements for varying periods of time. Powering down one or more of its components assists in conserving battery power (especially as the trend continues to create smaller and smaller electronic devices), as less resources need to be supplied with power. The UE may wake up periodically to monitor paging messages applicable to that UE in case the UE must engage in some activity. Such paging messages may alert the UE to the presence of, e.g., incoming calls, and/or may provide other information. In the connected mode, the UE may actively exchange data with one or more network elements to effectuate, e.g., a voice call or a data call, etc.

A mechanism utilized to control how/when the UE powers down/wakes up may be referred to discontinuous reception (DRX). That is, the UE may periodically monitor paging messages in accordance with a DRX cycle. The DRX cycle may indicate when the UE should wake up to monitor paging messages (when the UE is in Radio Resource Control (RRC) idle mode, i.e., when the RRC connection is released), and when the UE may power down to conserve battery life. If the DRX cycle is too long, then there may be long delays in sending paging messages to the UE. Conversely, if the DRX cycle is too short, then the UE may be monitoring paging messages too frequently, resulting in excessive battery drain.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
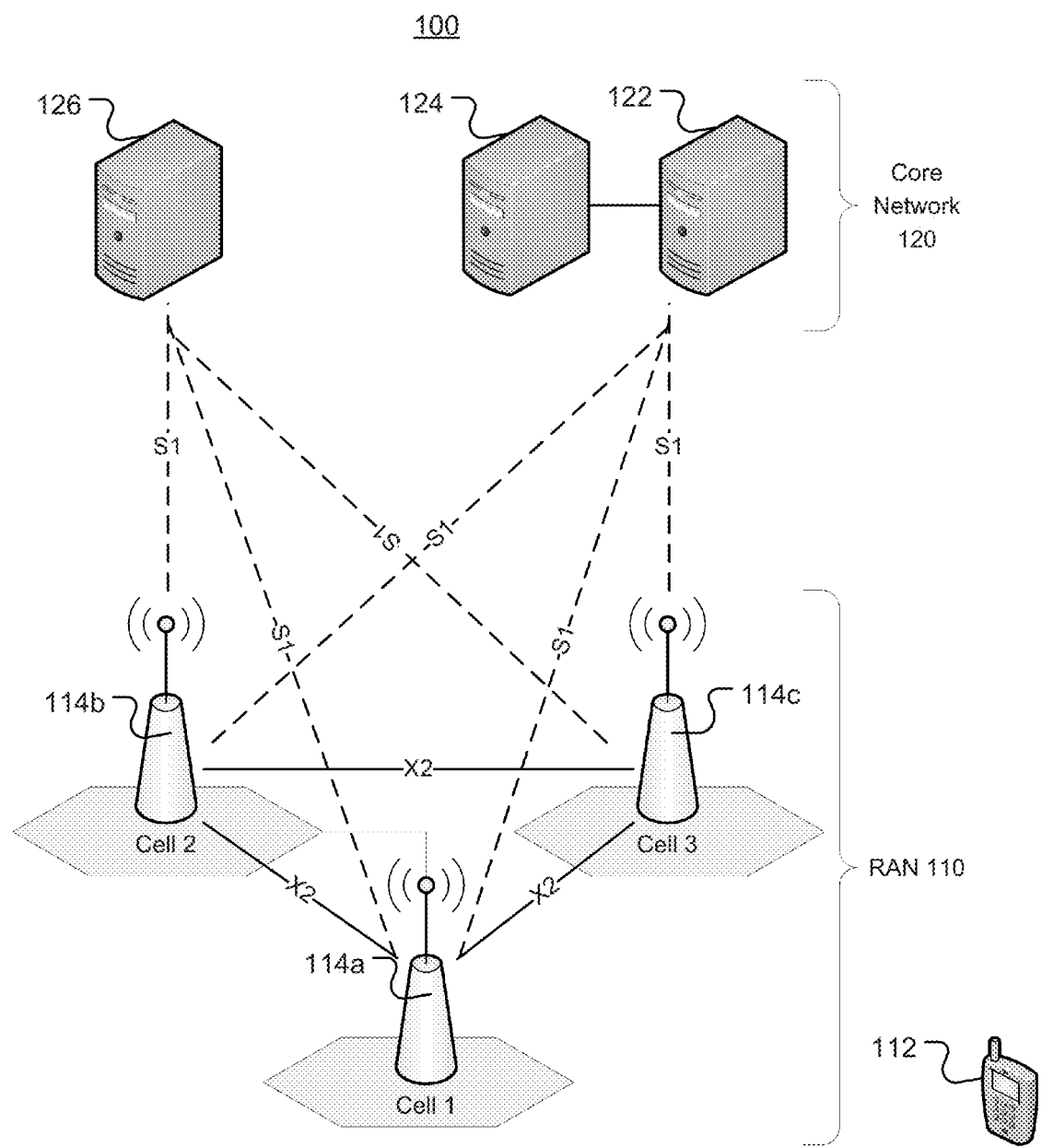
FIG. 1 illustrates an example communications network 100 in which various methods and apparatuses may be utilized in accordance with various embodiments.

FIG. 1 illustrates an example communications network 100 in which various methods and apparatuses may be utilized in accordance with various embodiments. Communications network 100 may be an LTE network or other type of wireless communications network, and may include a radio area network (RAN) 110 and a core network 120. The RAN 110 may support radio communications for UEs (such as UE 112) within its coverage area. The RAN 110 may be referred to as an Evolved Universal Terrestrial Radio Access Network (E-UTRAN), as it may employ evolved universal mobile telecommunications system (UMTS) terrestrial radio access (E-UTRA) radio technology to communicate with one or more UEs over an air interface. The RAN 110 may also be in communication with the core network 120, where the core network 120 may support various services for the UE 112.

The RAN 110 may include one or more evolved Node Bs (eNBs), which may also be referred to as base stations, Node B's, access points, etc. FIG. 1 illustrates the RAN 110 as including eNBs 114a, 114b, and 114c. It should be noted that the RAN 110 may include any number of eNBs in accordance with various embodiments. The eNBs 114a, 114b, 114c may each include one or more transceivers for communicating with the UE 112 over the aforementioned air interface.

Each of the eNBs 114a, 114b, 114c may be associated with one or more cells (e.g., Cell 1, Cell 2, and Cell 3, respectively), and may be configured to handle radio resource management decisions, handover decisions/mobility management, scheduling of users in the uplink (UL) and/or downlink (DL), etc. Communication between the eNBs 114a, 114b, and 114c may occur over an X2 interface.

The core network 120 may include various network entities, and may separate user plane and control plane traffic. In this example architecture, the core network 120, which may be referred to as an Evolved packet core (EPC), may be made up of control and user plane entities. A control plane entity referred to as a Mobility Management Entity (MME) may handle control plane traffic, while user plane traffic may be handled by a user plane entities referred to as a Serving Gateway (SGW) and a Packet Data Network (PDN) Gateway (PDN GW or PGW).

The core network 120 may facilitate communications with other networks. For example, the core network 120 may provide access (for the UE 112) to circuit-switched networks, such as the Public Switched Telephone Network (PSTN). The core network 120 may also facilitate communications between the UE 112 and land-line communications devices. For example, the core network 120 may include, or may communicate with, an Internet Protocol (IP) gateway, (e.g., an IP multimedia subsystem (IMS) server), that serves as an interface between the core network 120 and the PSTN. In addition, the core network 120 may provide the UE 112 with access to other networks, which may include other wired or wireless networks that are owned and/or operated by other service providers.

For simplicity, a single SGW 122, a single PGW 124, and one MME 126 are illustrated as being included in the core network 120. The SGW 122 may support data services such as packet data, Voice-over-Internet Protocol (VoIP) communications, video, messaging, etc., and may be connected to each of the eNBs 114a, 114b, and 114c in the RAN 110 via S1 interfaces. The SGW 122 may generally route and forward user data packets to/from the UE 112. The SGW 122 may also perform other functions, such as anchoring user planes during inter-eNB handovers, triggering paging when DL data is available for the UE 112, managing and storing contexts of the UE 112, etc.

A PGW (e.g., PGW 124) may be the interface between the LTE "subsystem" and IP networks, which may include, but are not limited to, the public Internet, and Internet Protocol Multimedia Subsystem (IMS) services that may be deployed within an operator core network.

An MME (e.g., MME 126) may be responsible for mobility management and path switching between eNBs at handover. The MME 126 may also perform paging for the core network 120. That is, and as illustrated in FIG. 1, the MME 126 may be connected to each of the eNBs 114a, 114b, and 114c in the RAN 110 via S1 interfaces, and may act as, alluded to above, a control node. For example, the MME 126 may be responsible for authenticating users of the UE 112, bearer activation/deactivation, selecting a particular SGW during an initial attach procedure of the UE 112, etc. The MME 126 may also provide a control plane function for switching between the RAN 110 and other RANs (not shown) that employ other radio technologies, such as the Global System for Mobile Communications (GSM) standard or the Wideband Code Division Multiple Access (WCDMA) standard. The SGW 122 may be connected to the PGW 124, which may provide the UE 112 with access to packet-switched networks, such as the aforementioned public Internet, to facilitate communications between the UE 112 and other IP-enabled devices.

While each of the foregoing elements are depicted as part of the core network 120, it will be appreciated that any one of these elements may be owned and/or operated by an entity other than the core network operator. Additionally, and in accordance with other embodiments, a pool of MMEs, a pool of PGWs, and a pool of SGWs may make up the core network 120, where an S1-flex mechanism may allow an eNB, such as eNBs 114a, 114b, and/or 114c to connect to the MME, PGW, and SGW pools for load balancing purposes.

It should be noted that the SGW 122 and the MME 126 may communicate with other entities, e.g., remote servers and terminals (not shown). Additionally, other wireless networks may include equivalent network entities. For example, a UTRAN supporting Wireless Code Division Multiple Access (WCDMA) may include the aforementioned node Bs (instead of eNBs) coupled to Radio Network Controllers (RNCs). A core network for UMTS may include Mobile Switching Centers (MSCs), Serving GPRS Support Nodes (SGSNs), and Gateway GPRS Support Nodes (GGSNs) (instead of SGWs and MMES).

The UE 112 may communicate with one or more of the eNBs 114a, 114b, and 114c, as well as with the MME 126 and the SGW 122. The UE 112 may communicate with network entities (e.g., the eNBs 114a, 114b, and 114c) in the RAN 110 via lower layer signaling, and may communicate with network entities (e.g., the MME 126 and the SGW 122) in the core network 120 via upper layer signaling, e.g., Non Access Stratum (NAS) signaling in UMTS and LTE. The UE 112 may also be referred to as a mobile station, a terminal, an access terminal, a subscriber unit, a station, etc., and the UE 112 may be, e.g., a cellular phone, as described above, a personal digital assistant (PDA), a wireless modem, a wireless communication device, a handheld device, a laptop computer, a cordless phone, a wireless local loop (WLL) station, etc. The eNBs 114a, 114b, and 114c may broadcast system information (SI) via a broadcast channel to provide information within various SI types, each of which provides information required by UEs, (e.g., network information (mobile country code (MCC)/mobile network code (MNC) of a network), frequency synchronization parameters, and the like). SI may include the aforementioned NAS and Access Stratum (AS) SI.

As previously alluded to, DRX is used in mobile communications to conserve the battery life of a UE, such as the UE 112, where during certain periods/time intervals (in an active/awake mode), data transfer may occur, and during other periods/time intervals, the UE 112 may turn its receiver off to enter into a low power state. A DRX cycle may be negotiated by the communications network 100 or sent/defined by the UE 112. In particular, and in accordance with UMTS and LTE standards, the UE 112 may indicate a DRX cycle length to the core network 120 via NAS signaling, e.g., during an attach procedure or a TAU procedure. This DRX cycle length may be specific to the UE 112, and the UE 112 may change the DRX cycle length depending on a particular service being received by the UE 112, a particular device type of the UE 112, and/or other factors. It should be noted that DRX cycle length in the context of various embodiments disclosed herein may refer to "idle mode" DRX cycle length, rather than "connected mode" DRX parameters, such as, e.g., short or long DRX cycle lengths."

The communications network 100 (e.g., MME 126, and ultimately, a relevant eNB, e.g., eNB 114a, 114b, or 114c) may send paging messages to the UE 112 in accordance with time intervals determined by the DRX cycle. These paging messages may alert the UE 112 to, e.g., incoming calls and/or may be used for other purposes. Alternatively, the communications network 100 may send the DRX cycle(s) over a broadcast channel by defining new SI block (SIB) information.

In particular, the DL Paging Control Channel (PCCH) is used to transmit paging information to UEs, where UEs may be notified of changes in SI, which may, e.g., require a reacquisition of SI. A UE uses DRX in idle mode to reduce battery consumption, as previously described, where a DRX cycle may be configured by certain parameters sent in an SI Block 2 (SIB2). The UE may monitor the PDCCH at certain intervals (set by the DRX cycle parameters) in order to check for the presence of a paging message. That is, the UE utilizes the DRX cycle during idle mode to wake itself up to check for such paging messages. If the PDCCH indicates that a paging message is being transmitted in a subframe, the UE may decode the Physical Downlink Shared Channel (PDSCH) to see if the paging message is directed to that UE. Paging messages may be sent to all eNBs within a TA.

One of the parameters used in defining a DRX cycle of a UE, such as the UE 112, may be referred to as DRX cycle length. In negotiating a DRX cycle, the UE 112 may chose a desired DRX cycle length to be utilized, and indicate that DRX cycle length to an MME, such as the MME 126. In accordance with the specification(s) governing NAS protocol usage in LTE networks, the UE 112 may initiate a TAU procedure by sending a TAU request to the MME 126 when the UE 112 wishes to change/update a specific DRX cycle parameter, such as DRX cycle length.

It should be noted that the initiation of a TAU procedure for other purposes, including, but not limited to. e.g., when the UE detects a TA that is not in the list of TAs that the UE 112 previously registered with the MME 126, when the UE 112 receives an indication that a Radio Resource Control (RRC) connection was released for load balancing, etc., is not affected/altered by the initiation or the blocking of a TAU procedure in accordance with various embodiments. That is, the UE 112 may initiate a TAU procedure as needed under "normal" circumstances as, e.g., set forth in the specification(s) governing NAS protocol usage in LTE networks.

In accordance with the standard(s) specifying paging procedures in the S1 protocol, the MME 126 may initiate a paging procedure by sending a paging message to an applicable eNB, e.g., eNB 114a, 114b, or 114c. Upon receiving the paging message from the MME 126, the relevant eNB (e.g., eNB 114a, 114b, or 114c) may perform paging of the relevant UE in the cell(s) which belong to TAs indicated in the (aforementioned) list of TAs information element (IE) (e.g., the UE 112 in one of more of the Cells 1, 2, and/or 3). For each of the cells (e.g., Cells 1, 2, and/or 3) that belong to any of the TAs indicated in the list of TAs IE, the relevant eNB (e.g., eNB 114a, 114b, or 114c) may generate a page on the radio interface. This paging procedure occurs in accordance with the DRX cycle (specified at least in part, by the DRX cycle length chosen, e.g., by the UE 112).

However, according to the RRC specifications for LTE networks, an eNB may use the shorter of a UE-specific/chosen DRX cycle length (which as previously described, may be indicated by an MME) and a "default" DRX cycle length that is broadcast in SI of the cell to page the UE. That is, and for example, the UE 112 may choose to update its DRX cycle length by initiating a TAU procedure to indicate its chosen DRX cycle length to the MME 126 in the manner described above.

Figure 2:
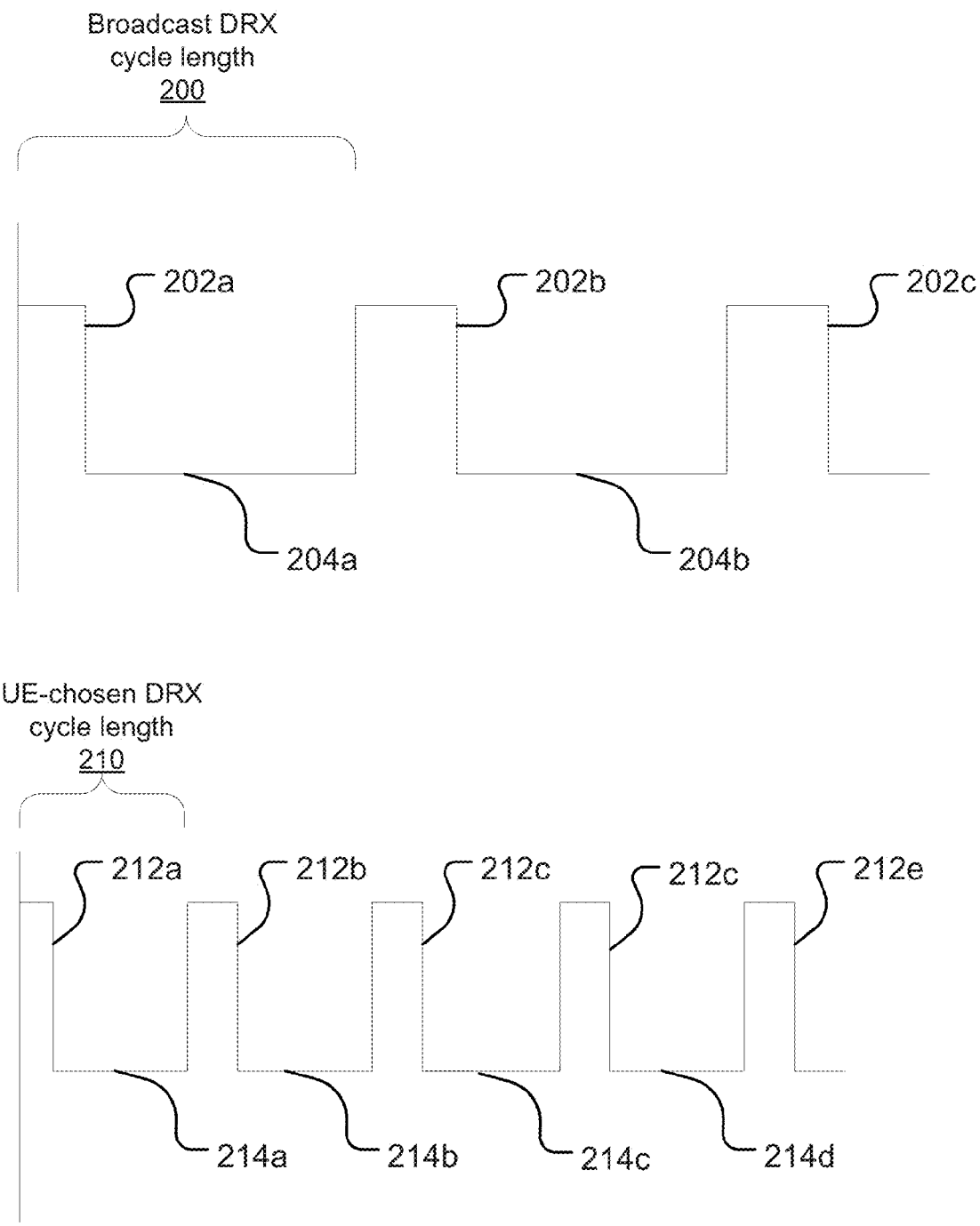
FIG. 2 illustrates an example comparison of DRX cycle lengths that may be utilized in the communications network of FIG. 1.

FIG. 2 illustrates an example representation of a DRX cycle length 200 broadcast by an eNB, e.g., eNB 114a, that is larger than a UE-chosen DRX cycle length 210 that is selected by a UE, e.g., UE 112. With respect to the DRX cycle length 200, an active/awake mode or duration may be indicated by periods 202a, 202b, and 202c. During these periods, the UE 112 may monitor the PDCCH for paging messages. Idle modes or durations may be indicated by periods 204a and 204b. It is during these idle mode periods 204a and 204b that DRX is utilized, e.g., the receiver of the UE 112 may be turned off. The DRX cycle length 200 includes one active/awake mode period and one idle mode period.

Similar to the DRX cycle length 200, active/awake mode periods 212a, 212b, 212c, 212d, and 212e of the UE-chosen DRX cycle length are periods where the UE 112 may monitor the PDCCH for paging messages, while idle mode periods 214a, 214b, 214c, and 214d are periods where, e.g., the receiver of the UE 112 may be turned off to conserve battery power. Like the DRX cycle length 200, the DRX cycle length 210 includes one active/awake mode period and one idle mode period. The UE-chosen DRX cycle length 210 is less than the DRX cycle length 200 broadcast by the eNB 114a, and therefore, as described above, the UE 112 may initiate a TAU procedure to update the DRX cycle configured in the MME 126 with the UE-chosen DRX cycle length 210.

If however, the DRX cycle length chosen by the UE 112 is larger than or equal to the DRX cycle length that is being broadcast in the SI of, e.g., Cell 1, in which the UE 112 is operating, the DRX cycle length chosen by the UE 112 will be ignored. Therefore, the system resources relied upon to initiate the TAU procedure, and the network traffic created by initiating the TAU procedure may be wasted.

Figure 3:
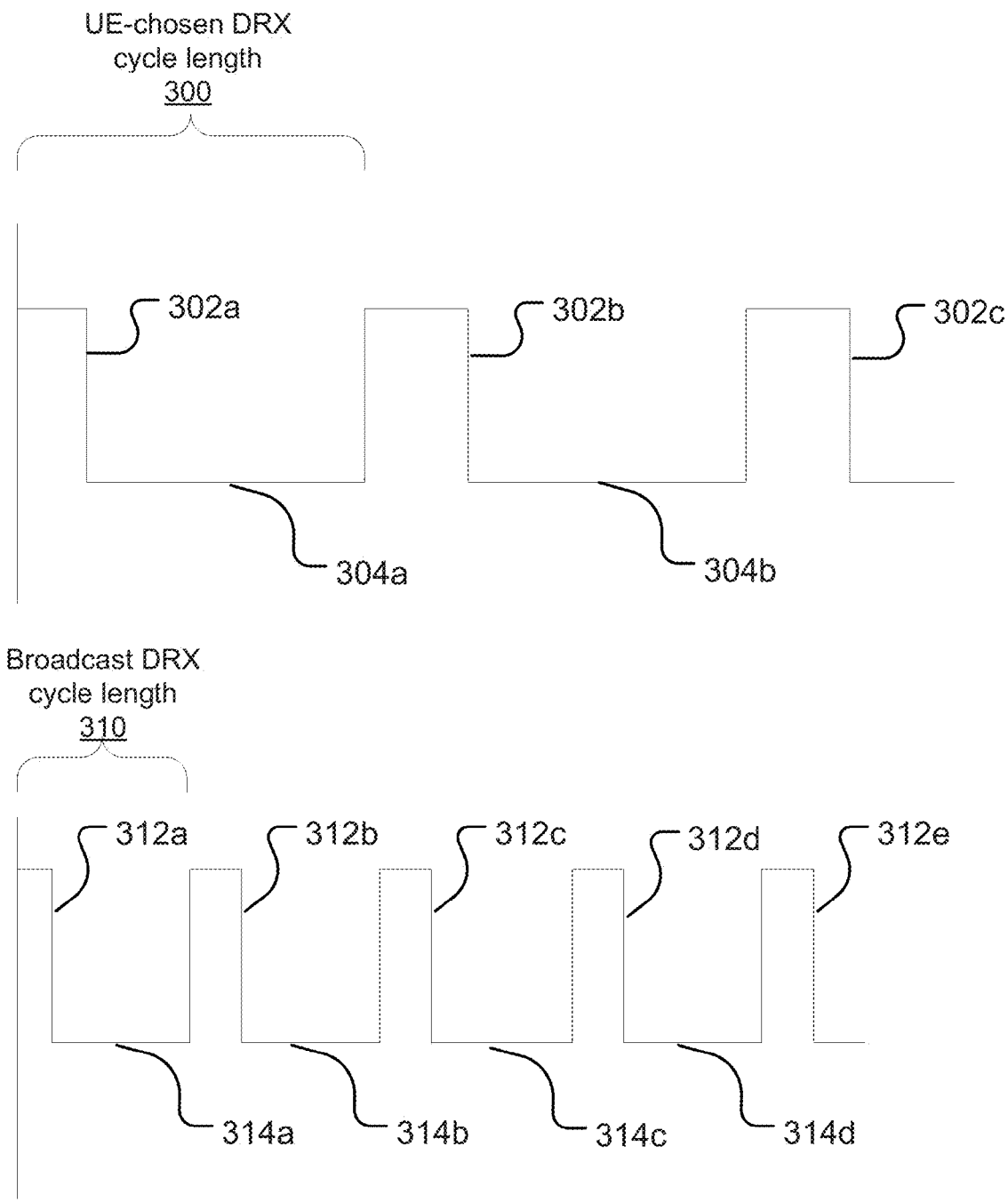
FIG. 3 illustrates another example comparison of DRX cycle lengths that may be utilized in the communications network of FIG. 1.

FIG. 3 illustrates an example representation of a UE-chosen DRX cycle length 300 selected by a UE, e.g., UE 112, that is longer than the DRX cycle length 310 broadcast by an eNB, e.g., eNB 114a. The UE-chosen DRX cycle length 300 includes active/awake mode periods 302a, 302b, and 302c, and idle mode periods 304a and 304b. The DRX cycle length 310 broadcast by the eNB 114a includes active/awake mode periods 312a, 312b, 312c, 312d, and 312e, as well as idle mode periods 314a, 314b, 314c, and 314d. In this scenario, a TAU procedure need not be initiated by the UE 112 because the DRX cycle length 310 broadcast by the eNB 114a is less than the UE-chosen DRX cycle length 300, and would be ignored.

To reduce unnecessary resource consumption and network traffic, and in accordance with various embodiments, a TAU procedure may be initiated to allow a UE to notify an MME of a new UE-chosen DRX cycle length only when the MME and relevant eNB will use the UE-chosen DRX cycle length. To determine whether or not a TAU will be initiated in accordance with various embodiments, three parameters may be considered. A first parameter may be the UE-chosen DRX cycle length that the UE wishes to indicate to the MME. A second parameter may be the DRX cycle length that is broadcast by the eNB in a cell in which the UE is operating. A third parameter may be the UE-chosen DRX cycle length that is already configured in an MME (if it exists).

In accordance with various embodiments, initiating a TAU procedure is avoided when the DRX cycle length that is being broadcast by the eNB is less than or equal to the smaller of the UE-chosen DRX cycle length that is already configured in the MME and the user-chosen DRX cycle length that the UE wishes to indicate to the MME. It should be noted that if a UE-chosen DRX cycle length has not yet been configured in the MME, the value of the third parameter may be considered to be greater than the UE-chosen DRX cycle length or infinity for purposes of making the above determination. That is, and considered from another perspective, initiating a TAU procedure can be avoided if the DRX cycle length that is being broadcast by the eNB is the lowest DRX cycle length among the two or more determined DRX cycle lengths (i.e., the DRX cycle length already configured in the MME and/or the DRX cycle length being broadcast by the eNB). Table 1 outlines example scenarios (following the aforementioned condition(s)) in which the three above-mentioned parameters are considered in determining whether or not to initiate a TAU for the purposes of notifying an MME of a UE-chosen DRX cycle length in accordance with various embodiments. For illustration purposes, DRX cycle length may be some value X1, X2, or X3 belonging to the following set of frames {32, 64, 128, 256}, where X1<X2<X3.

To the above, the DRX cycle length parameter may be transmitted in SIB2 to allow a UE to calculate the DRX cycle, and determine when to wake up to monitor for paging messages. Thus, the DRX cycle length, which may be representative of the number of radio frames in a paging cycle, may be transmitted in the SIB2. The time between paging messages for a UE may be calculated, and, again, if the UE-chosen DRX cycle length is shorter than that specified by that being broadcast by an eNB, the UE-chosen DRX cycle length will override that being broadcast.

TABLE 1

| Scenario | DRX cycle length already configured in MME | UE-chosen DRX cycle length | DRX cycle length broadcast by eNB | Initiate TAU procedure to notify MME of new DRX cycle length |
| --- | --- | --- | --- | --- |
| 1 | — | X1 | X2 | YES |
| 2 | — | X2 | X1 | NO |
| 3 | — | X1 | X1 | NO |
| 4 | X1 | X2 | X3 | YES |
| 5 | X1 | X3 | X2 | YES |
| 6 | X2 | X1 | X3 | YES |

TABLE 1-continued

| Scenario | DRX cycle length already configured in MME | UE-chosen DRX cycle length | DRX cycle length broadcast by eNB | Initiate TAU procedure to notify MME of new DRX cycle length |
|---|---|---|---|---|
| 7 | X2 | X3 | X1 | NO |
| 8 | X3 | X1 | X2 | YES |
| 9 | X3 | X2 | X1 | NO |
| 10 | X1 | X2 | X2 | YES |
| 11 | X2 | X1 | X1 | NO |
| 12 | X1 | X2 | X1 | NO |
| 13 | X2 | X1 | X2 | YES |

In a first example scenario, no DRX cycle length has yet been configured in an MME, a UE-chosen DRX cycle length may be X1, and a DRX cycle length broadcast by an eNB may be X2. Because the UE-chosen DRX cycle length is less than the DRX cycle length being broadcast by the eNB, a TAU procedure to notify the MME of a new DRX cycle length (e.g., the UE-chosen DRX cycle length) may be initiated.

In a second example scenario, again, no DRX cycle length has yet been configured in the MME, the UE-chosen DRX cycle length may be X2, and the DRX cycle length broadcast by an eNB may be X1. Because the UE-chosen DRX cycle length is greater than the DRX cycle length being broadcast by the eNB, a TAU procedure to notify the MME of a new DRX cycle length (e.g., the UE-chosen DRX cycle length) need not be initiated.

In a third example scenario, yet again, no DRX cycle length has yet been configured in the MME, the UE-chosen DRX cycle length may be X1, and the DRX cycle length broadcast by an eNB may be X1. Because the DRX cycle length broadcast by the eNB is equal to the UE-chosen DRX cycle length (as well as infinity/greater that the UE-chosen DRX cycle length in the case of no DRX cycle length being configured in the MME), a TAU procedure to notify the MME of a new DRX cycle length (e.g., the UE-chosen DRX cycle length) need not be initiated.

In a fourth example scenario, a DRX cycle length of X1 may have already been configured in the MME, the UE-chosen DRX cycle length may be X2, and the DRX cycle length broadcast by an eNB may be X3. Because the UE-chosen DRX cycle length is less than the DRX cycle length being broadcast by the eNB, a TAU procedure to notify the MME of a new DRX cycle length (e.g., the UE-chosen DRX cycle length) may be initiated.

In a fifth example scenario, a DRX cycle length of X1 may have been configured in the MME, the UE-chosen DRX cycle length may be X3, and the DRX cycle length broadcast by an eNB may be X2. In this fourth scenario, the UE-chosen DRX cycle length is greater than the DRX cycle length being broadcast by the eNB. However, and because the DRX cycle length that has already been configured in the MME is less than both the UE-chosen DRX cycle length and the DRX cycle length being broadcast by the eNB, a TAU procedure to notify the MME of a new DRX cycle length (e.g., the UE-chosen DRX cycle length) may still be initiated.

In a sixth example scenario, a DRX cycle length of X2 may have been configured in the MME, the UE-chosen DRX cycle length may be X1, and the DRX cycle length broadcast by an eNB may be X3. Again, and because the UE-chosen DRX cycle length is less than the DRX cycle length being broadcast by the eNB, a TAU procedure to notify the MME of a new DRX cycle length (e.g., the UE-chosen DRX cycle length) may be initiated.

In a seventh example scenario, a DRX cycle length of X2 may have been configured in the MME, the UE-chosen DRX cycle length may be X3, and the DRX cycle length broadcast by an eNB may be X1. Because the UE-chosen DRX cycle length is greater than the DRX cycle length being broadcast by the eNB, a TAU procedure to notify the MME of a new DRX cycle length (e.g., the UE-chosen DRX cycle length) need not be initiated.

In a eighth example scenario, a DRX cycle length of X3 may have been configured in the MME, the UE-chosen DRX cycle length may be X1, and the DRX cycle length broadcast by an eNB may be X2. Because the UE-chosen DRX cycle length is less than the DRX cycle length being broadcast by the eNB, a TAU procedure to notify the MME of a new DRX cycle length (e.g., the UE-chosen DRX cycle length) may be initiated.

In a ninth example scenario, a DRX cycle length of X3 may have been configured in the MME, the UE-chosen DRX cycle length may be X2, and the DRX cycle length broadcast by an eNB may be X1. Because the UE-chosen DRX cycle length is greater than the DRX cycle length being broadcast by the eNB, a TAU procedure to notify the MME of a new DRX cycle length (e.g., the UE-chosen DRX cycle length) need not be initiated.

In a tenth example scenario, a DRX cycle length of X1 may have been configured in the MME, the UE-chosen DRX cycle length may be X2, and the DRX cycle length broadcast by an eNB may also be X2. Similar to the fourth example scenario described previously, and because the DRX cycle length that has already been configured in the MME is less than both the UE-chosen DRX cycle length and the DRX cycle length being broadcast by the eNB, a TAU procedure to notify the MME of a new DRX cycle length (e.g., the UE-chosen DRX cycle length) may still be initiated.

In an eleventh example scenario, a DRX cycle length of X2 may have been configured in the MME, the UE-chosen DRX cycle length may be X1, and the DRX cycle length broadcast by an eNB may be X1. Because the UE-chosen DRX cycle length is equal to the DRX cycle length being broadcast by the eNB (which is the smaller of the DRX cycle length configured in the MME), a TAU procedure to notify the MME of a new DRX cycle length (e.g., the UE-chosen DRX cycle length) need not be initiated.

In a twelfth example scenario, a DRX cycle length of X1 may have been configured in the MME, the UE-chosen DRX cycle length may be X2, and the DRX cycle length broadcast by an eNB may be X1. Because the DRX cycle length broadcast by an eNB is less than the DRX cycle length already configured in the MME as well as the UE-chosen DRX cycle length, a TAU procedure to notify the MME of a new DRX cycle length (e.g., the UE-chosen DRX cycle length) may be avoided.

In a thirteenth example scenario, a DRX cycle length of X2 may have been configured in the MME, the UE-chosen DRX cycle length may be X1, and the DRX cycle length being broadcast by the eNB may be X2. Between the DRX cycle length configured in the MME and the UE-chosen DRX cycle length, the smaller value is that of the UE-chosen DRX cycle length. Because the DRX cycle length being broadcast in the eNB is greater than the UE-chosen DRX cycle length, a TAU procedure to notify the MME of a new DRX cycle length (e.g., the UE-chosen DRX cycle length) may be initiated.

From the above-described example scenarios, it can be seen that in six out of the thirteen example scenarios, initiating a TAU procedure would be unwarranted as the UE-chosen DRX cycle length would be ignored in accordance with the LTE standard. Thus, at least a 46% reduction in the amount of TAU procedures being initiated may be possible in accordance with various embodiments.

It should be noted that certain situations may arise, where the selection and/or broadcasting of a DRX cycle length may occur "in-between" phases/aspects of the aforementioned example scenarios and/or other considerations may be taken into account. In such situations, additional mechanisms may be employed in determining whether or not to initiate a TAU procedure to notify an MME of a UE-chosen DRX cycle length.

For example, a scenario may arise, where a UE has selected a DRX cycle length, and based upon an initial DRX cycle length being broadcast by an eNB, it is determined that the UE may initiate a TAU procedure to indicate the UE-chosen DRX cycle length to the MME (e.g., the UE-chosen DRX cycle length is less than the initial DRX cycle length broadcast by the eNB). However, and prior to the UE initiating the TAU procedure to indicate the UE-chosen DRX cycle length to the MME, the DRX cycle length being broadcast by an eNB may change. The change in DRX cycle length being broadcast by an eNB may be the result of, e.g., a change in cells being served by the eNB or a change in broadcast information. In accordance with one embodiment, the UE may re-evaluate/re-determine whether or not a TAU procedure may be initiated based on the later-occurring DRX cycle length now being broadcast by the eNB rather than the initial DRX cycle length that was previously broadcast. Alternatively still, re-evaluating whether or not a TAU procedure may be initiated may occur if the UE-chosen DRX cycle length changes.

Another scenario may arise, where a TAU procedure is initiated for purposes other than to indicate a UE-chosen DRX cycle length to the MME. As described above, one such purpose for initiating a TAU procedure under "normal" circumstances, may be when a UE detects entering a TA that is not on the list of TAs that the UE previously registered in the MME. In accordance with another embodiment, and if a TAU procedure is initiated under such "normal" circumstances, and a UE-chosen DRX cycle length is selected by the UE but has not yet been indicated to the MME, the UE may include the UE-chosen DRX cycle length in the TAU procedure regardless of the value of the UE-chosen DRX cycle length compared to the DRX cycle length currently being broadcast by the eNB in a cell and the already configured DRX cycle length in the MME (if it exists). That is, indicating the UE-chosen DRX cycle length may be piggy-backed on a TAU procedure initiated for other reasons.

Yet another scenario may arise, where the UE may forgo initiating a TAU procedure to indicate a new, UE-chosen DRX cycle length to the MME. In this scenario, the UE may have previously indicated a first UE-chosen DRX cycle length to the MME. Thereafter, the UE may wish to select a second UE-chosen DRX cycle length. However, the second UE-chosen DRX cycle length may be larger than the first UE-chosen DRX cycle length that was previously indicated to the MME, and currently configured in the MME, both of which, in turn, may be larger than the DRX cycle length being broadcast in the cell. Accordingly, and as described above, a TAU procedure need not be initiated as the second UE-chosen DRX cycle length is greater than that first UE-chosen DRX cycle length, and now configured in the MME. The UE may again, select a change/want to update the DRX cycle length to a third UE-chosen DRX cycle length that is the same value as that of the first UE-chosen DRX cycle length. In this situation, the UE may re-evaluate/re-determine whether or not a TAU procedure may be initiated. Therefore, and in accordance with yet another embodiment, subsequent to blocking the initiation of a TAU procedure, the UE may compare its most recent UE-chosen DRX cycle length to the DRX cycle length already configured in the MME to determine whether or not a TAU procedure should be initiated. In this instance, the MME and the UE are already in sync with respect to DRX cycle length.

Figure 4:
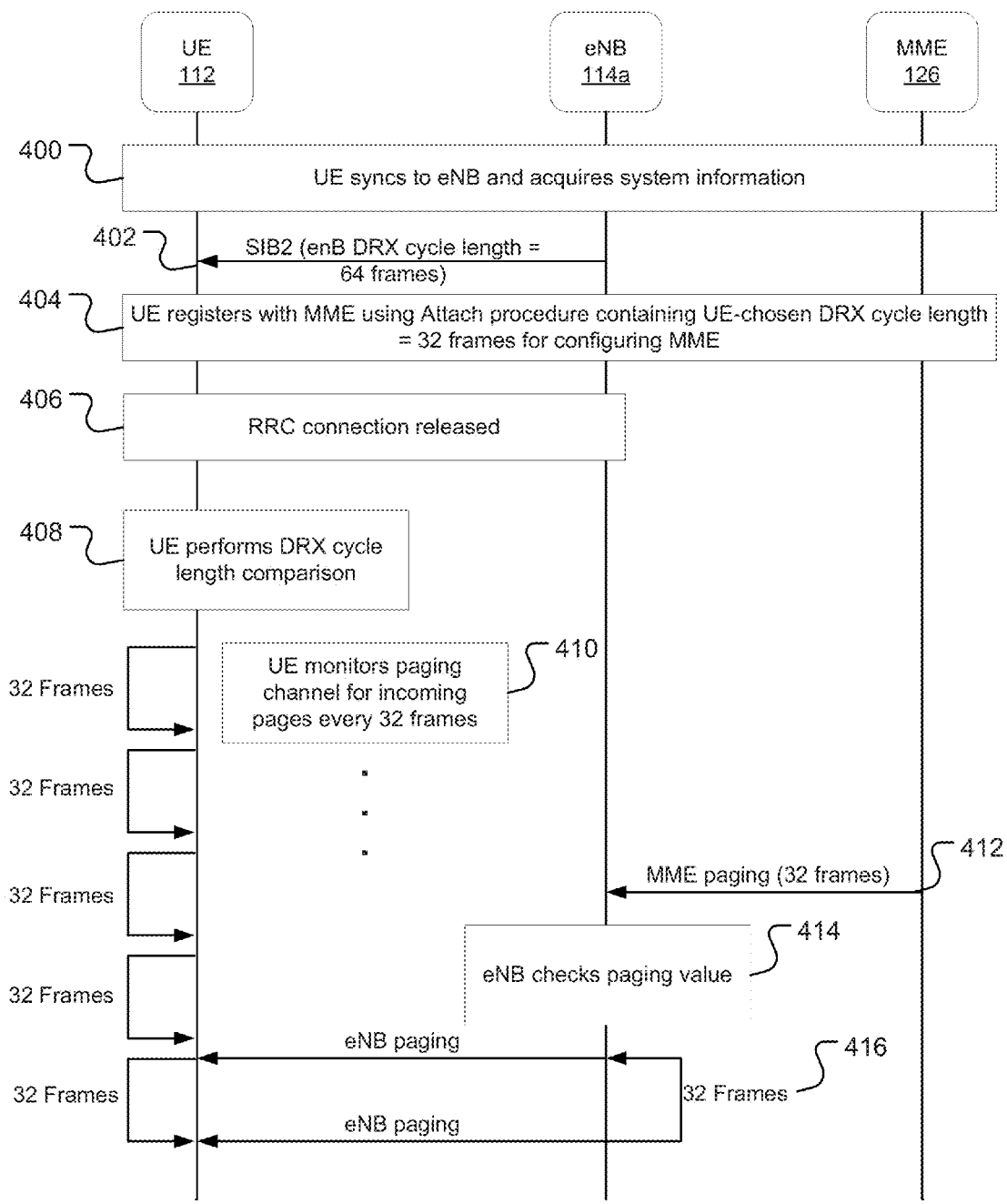
FIG. 4 illustrates a first example message flow indicative of DRX cycle length usage pursuant to a UE registering with an MME.

FIG. 4 illustrates a first example message flow diagram indicative of DRX cycle length usage pursuant to a UE registering with an MME. At 400, the UE 112 syncs to the eNB 114a and acquires SI. This may occur at power up of the UE 112. As part of acquiring the SI (i.e., SIB2), the UE 112 may acquire the DRX cycle length being broadcast by the eNB 114a, which in this scenario may be 64 frames, at 402. The UE 112 may register with the MME 126 using an Attach procedure, and the MME 126 may be configured with a DRX cycle length of 32 frames at 404. That is, an Attach request message may be sent by the UE 112 to the MME 126. The Attach request message may contain a UE-chosen DRX cycle length, which in this instance, may be 32 frames. Accordingly, the MME 126 becomes aware of the UE-chosen DRX cycle length. An RRC connection between the UE 112 and the eNB 114a may be released, and the UE 112 need only listen for pages from the eNB 114a at 406. The UE 112 may perform a DRX cycle length comparison and may determine that the DRX cycle length specified in the SIB2 from the eNB 114a is greater than its UE-chosen DRX cycle length, and therefore may utilize its UE-chosen DRX cycle length to monitor for paging messages from the eNB 114a at 408. Accordingly, and at 410, the UE 112 may monitor the paging channel (i.e., PDCCH) for incoming paging messages every 32 frames. At 412, whenever the MME 126 wishes to page the UE 112, the MME 126 may send a paging message containing the UE-chosen DRX cycle length, i.e., at 32 frames. The eNB 114a may check the paging value from the MME 126 at 414. In this instance, the paging value from the MME 126 is 32 frames, and is less than the DRX cycle length it is broadcasting in its cell(s) (in this instance, 64 frames), and therefore, the eNB 114a may send paging messages every 32 frames at 416.

Figure 5:
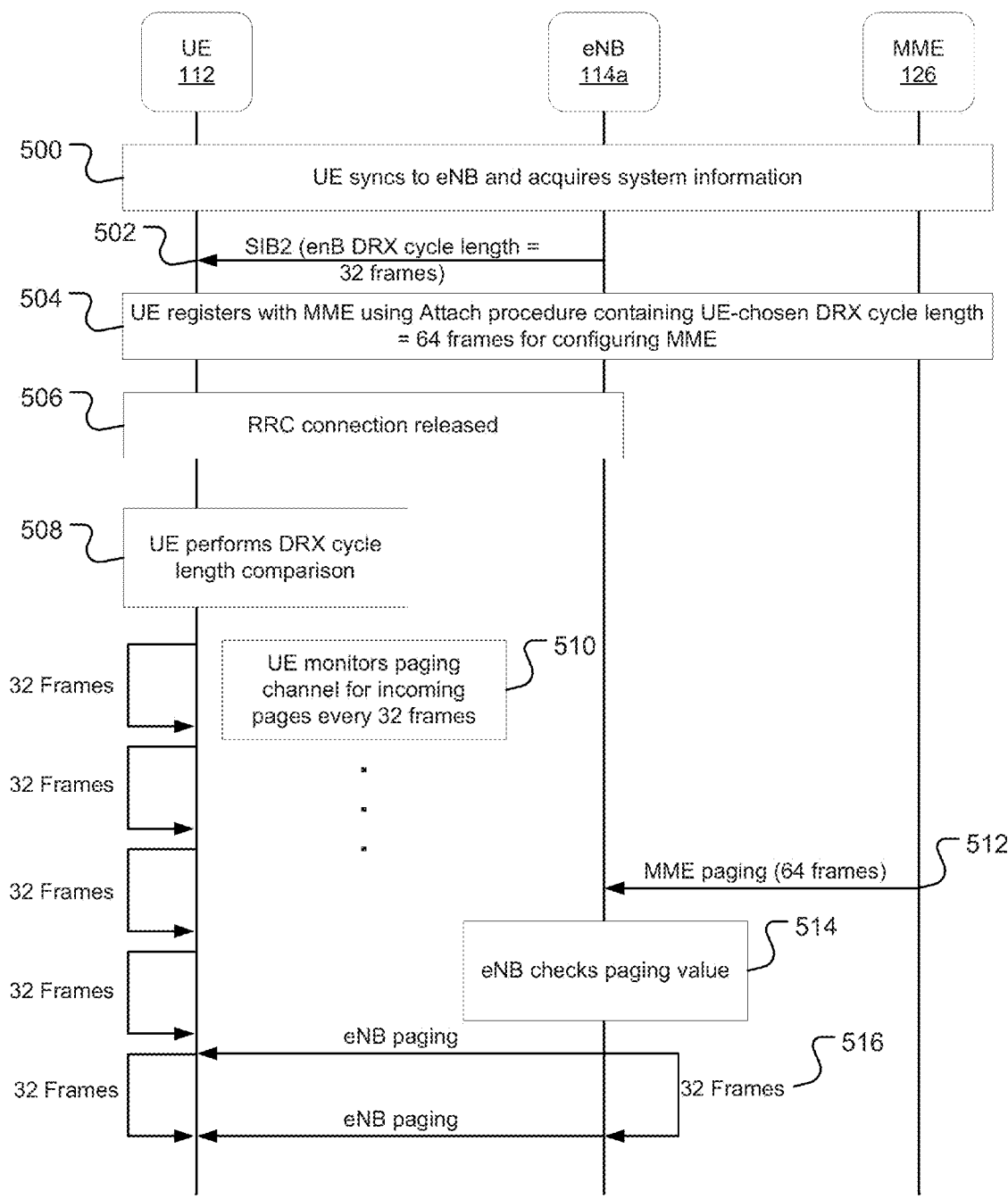
FIG. 5 illustrates a second example message flow diagram indicative of DRX cycle length usage pursuant to a UE registering with an MME.

FIG. 5 illustrates a second example message flow diagram indicative of DRX cycle length usage pursuant to a UE registering with an MME. At 500, the UE 112 syncs to the eNB 114a and acquires SI. Again, this may occur at power up of the UE 112. As part of acquiring the SI (i.e., SIB2), the UE 112 may acquire the DRX cycle length being broadcast by the eNB 114a, which in this scenario may be 32 frames, at 502. The UE 112 may register with the MME 126 using an Attach procedure at 504. Again, an Attach request message is sent by the UE 112 to the MME 126. The Attach request message may contain a UE-chosen DRX cycle length, which in this instance, may be 64 frames. Accordingly, the MME 126 becomes aware of the UE-chosen DRX cycle length. An RRC connection between the UE 112 and the eNB 114a may be released, and the UE 112 need only listen for pages from the eNB 114a with its identity at 506. The UE 112 may perform a DRX cycle length comparison and may determine that the DRX cycle length specified in the SIB2 from the eNB 114a is less than its UE-chosen DRX cycle length, and therefore utilizes DRX cycle length broadcast by the eNB 114a to monitor for paging messages from the eNB 114a at 508. Accordingly, and at 510, the UE 112 monitors the paging channel (i.e., PDCCH) for incoming paging messages every 32 frames. At 512, whenever the MME 126 wishes to page the UE 112, the MME 126 sends a paging message containing the UE-chosen DRX cycle length, i.e., at 64 frames. The eNB 114a may check the paging value from the MME 126 at 514. In this instance, the paging value from the MME 126 is 64 frames, and is greater than the DRX cycle length it is broadcasting in its cell(s) (in this instance, 32 frames), and therefore, sends paging messages every 32 frames at 516.

Figure 6:
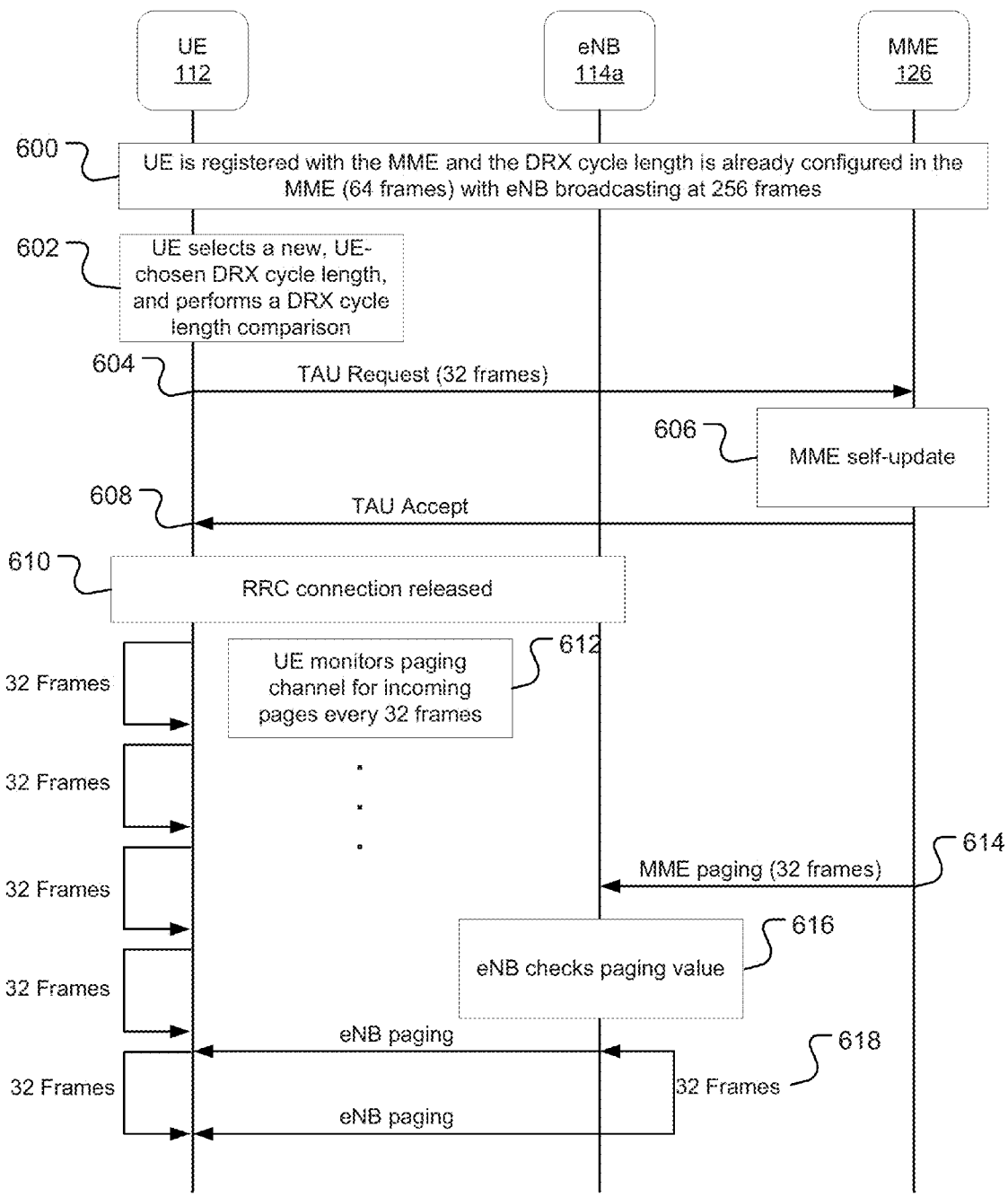
FIG. 6 illustrates an example message flow diagram indicative of when a TAU procedure may be utilized to update a DRX cycle length in accordance with various embodiments.

FIG. 6 illustrates an example message flow diagram indicative of when a TAU procedure is used to update a DRX cycle length in accordance with the sixth example scenario described above. At 600, the UE 112 is already registered with the MME 126, and the DRX cycle length configured at the MME 126 may be 64 frames, while the DRX cycle length being broadcast by the eNB 114*a* may be 256 frames. The UE 112 may wish to select a new UE-chosen DRX cycle length of 32 frames, and may perform a DRX cycle length comparison at 602. From the DRX cycle length comparison, the UE 112 may determine that the DRX cycle length specified in the SIB2 from the eNB 114*a*, as well as the DRX cycle length configured in the MME 126 are greater than its UE-chosen DRX cycle length. Accordingly, the UE 112 may initiate a TAU procedure to update the DRX cycle length configured in the MME 126. Hence, at 604, a TAU request that includes the DRX cycle length of 32 frames is sent to the MME 126. The MME updates its configured DRX cycle length at 606, and returns a TAU accept message to the UE 112 at 608. As before, the RRC connection between the eNB 114*a* and the UE 112 may be released at 610. The UE may listen to pages from the eNB with its identity, and accordingly, at 612, the UE 112 monitors the paging channel (i.e., PDCCH) for incoming paging messages every 32 frames. At 614, whenever the MME 126 wishes to page the UE 112, the MME 126 sends a paging message containing the UE-chosen DRX cycle length, i.e., at 32 frames. The eNB 114*a* may check the paging value from the MME 126 at 616. In this instance, the paging value from the MME 126 is now 32 frames, which is less than the DRX cycle length it is broadcasting in its cell(s) (in this instance, 256 frames), and therefore, the eNB 114*a* sends paging messages every 32 frames at 618.

Figure 7:
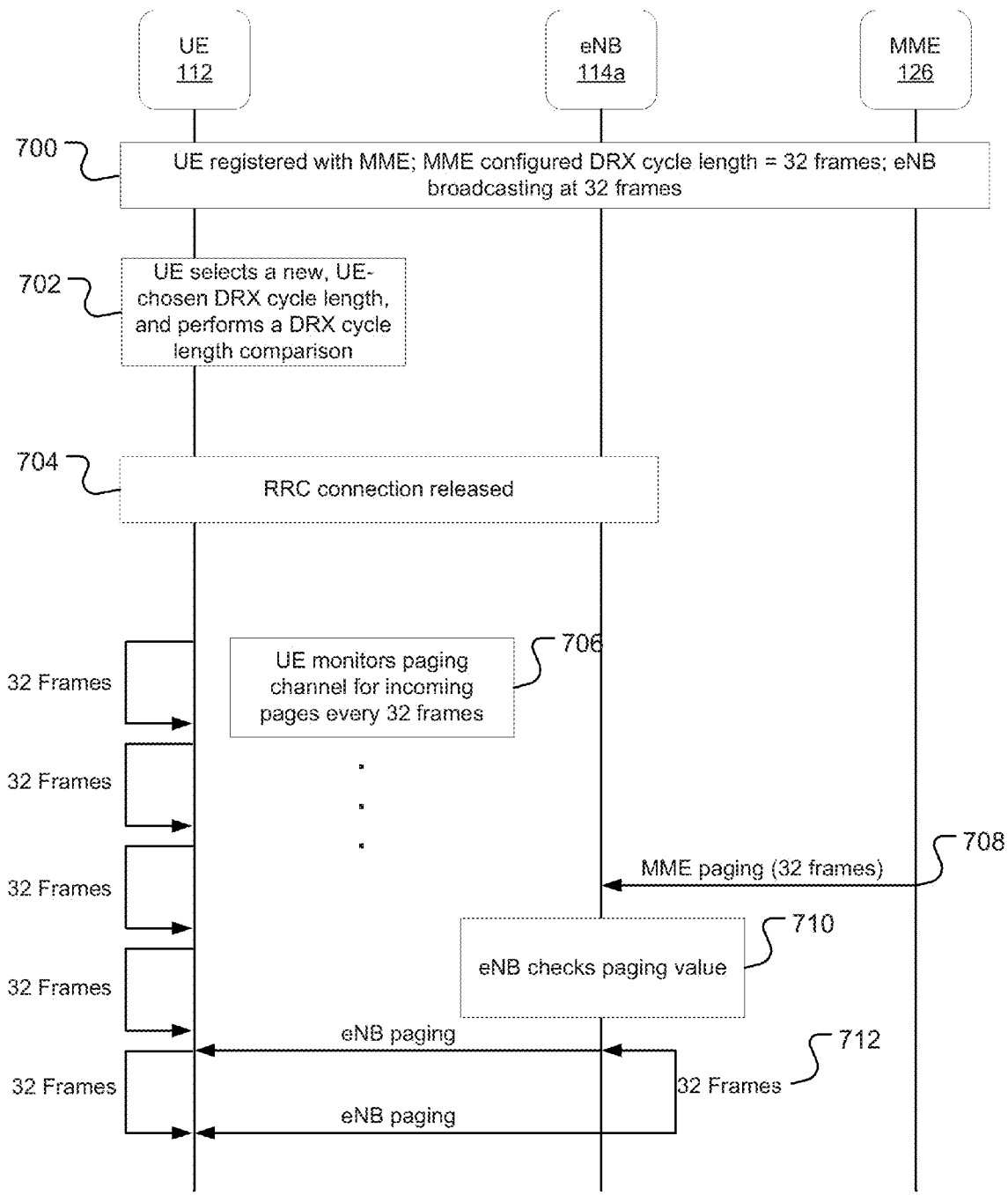
FIG. 7 illustrates an example message flow diagram indicative of when a TAU procedure need not be utilized to update a DRX cycle length in accordance with various embodiments.

FIG. 7 illustrates an example message flow diagram indicative of when a TAU procedure is not used to update a DRX cycle length in accordance with the twelfth example scenario described above. At 700, the UE 112 is already registered with the MME 126, and the DRX cycle length configured at the MME 126 may be 32 frames, while the DRX cycle length being broadcast by the eNB 114*a* may be 32 frames. The UE 112 may wish to select a new UE-chosen DRX cycle length of 128 frames, and may perform a DRX cycle length comparison at 702. From the DRX cycle length comparison, the UE 112 may determine that the DRX cycle length specified in the SIB2 from the eNB 114*a*, as well as the DRX cycle length configured in the MME 126 are less than its UE-chosen DRX cycle length. Accordingly, the UE 112 need not initiate a TAU procedure to update the DRX cycle length configured in the MME 126. As before, the RRC connection between the eNB 114*a* and the UE 112 may be released at 704. The UE may listen to pages from the eNB with its identity, and accordingly, at 706, the UE 112 monitors the paging channel (i.e., PDCCH) for incoming paging messages every 32 frames. At 708, whenever the MME 126 wishes to page the UE 112, the MME 126 sends a paging message containing the UE-chosen DRX cycle length, i.e., at 32 frames. The eNB 114*a* may check the paging value from the MME 126 at 710. In this instance, the paging value from the MME 126 is 32 frames, which is equal to the DRX cycle length it is broadcasting in its cell(s) (in this instance, 32 frames), and therefore, the eNB 114*a* sends paging messages every 32 frames at 618.

Figure 8:
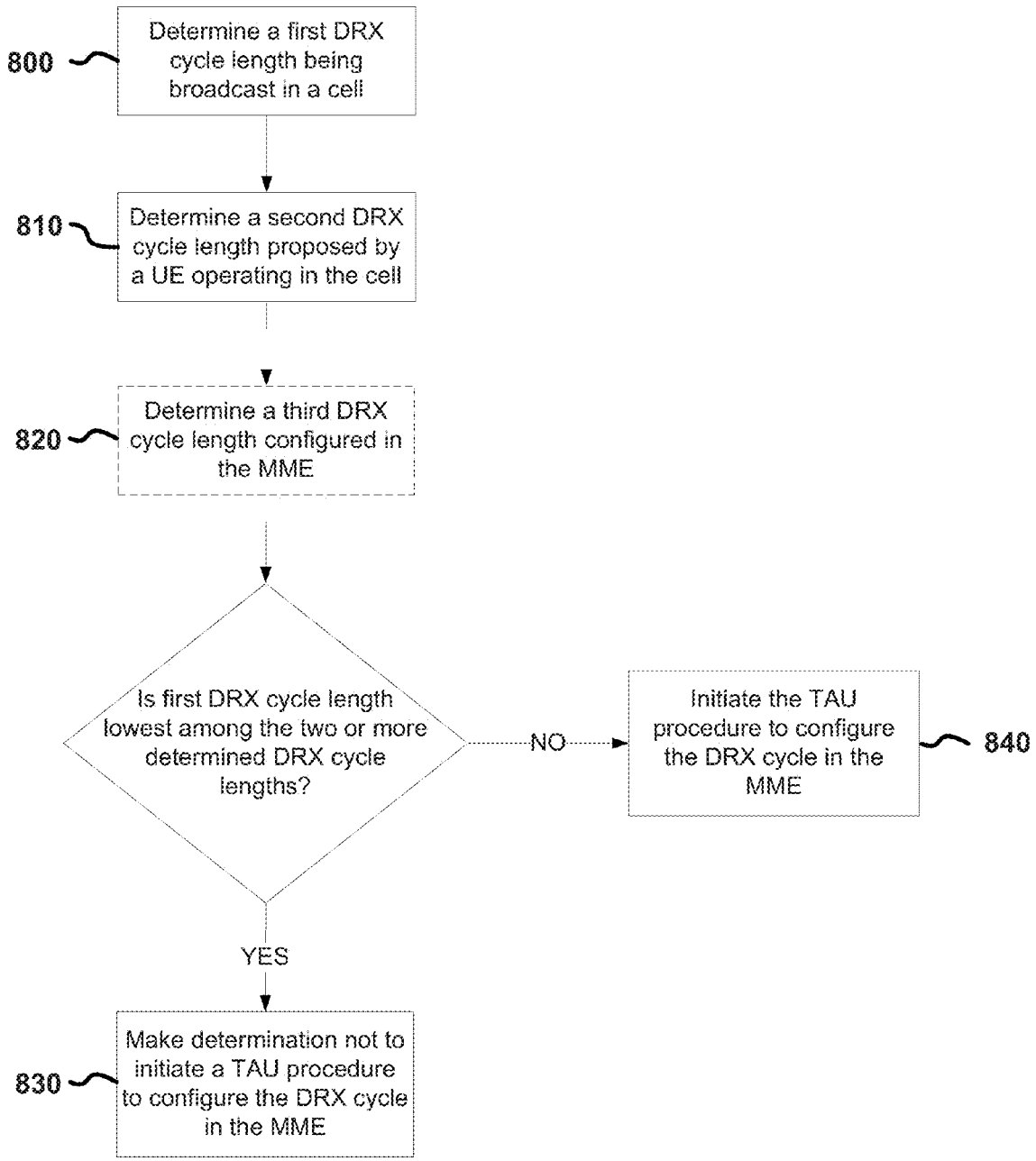
FIG. 8 illustrates example processes performed for determining whether a TAU procedure should be utilized to update a DRX cycle length in an MME in accordance with one embodiment.

FIG. 8 illustrates example processes performed in accordance with one embodiment to determine whether or not a TAU procedure should be initiated to update a DRX cycle length configured in an MME, where two or more DRX cycle lengths may be determined, including determining a first DRX cycle length being broadcast in a cell and determining a second DRX cycle length proposed by a UE operating in the cell. That is, and at 800, a first DRX cycle length being broadcast in a cell is determined. As previously described, an eNB serving the cell in which the UE operates may be broadcasting a DRX cycle length in that cell. At 810, a second DRX cycle length proposed by a UE operating in the cell is determined. As also previously described, a UE may select a UE-chosen DRX cycle length, and may wish to update the DRX cycle length currently configured in an MME with the UE-chosen DRX cycle length. At 820, a third DRX cycle length, if already configured in an MME, can be determined. Regardless of whether the third DRX cycle length is already configured, however, it is determined whether the first DRX cycle is the lowest among the two or more DRX cycle lengths. At 830, and if the first DRX cycle length is the lowest among the two or more determined DRX cycle lengths, a determination is made not to initiate a TAU procedure to configure the DRX cycle in the MME. At 840, and if the first DRX cycle length is not the lowest among the two or more determined DRX cycle lengths, the TAU procedure to initiate the DRX cycle in the MME is initiated.

Figure 9:
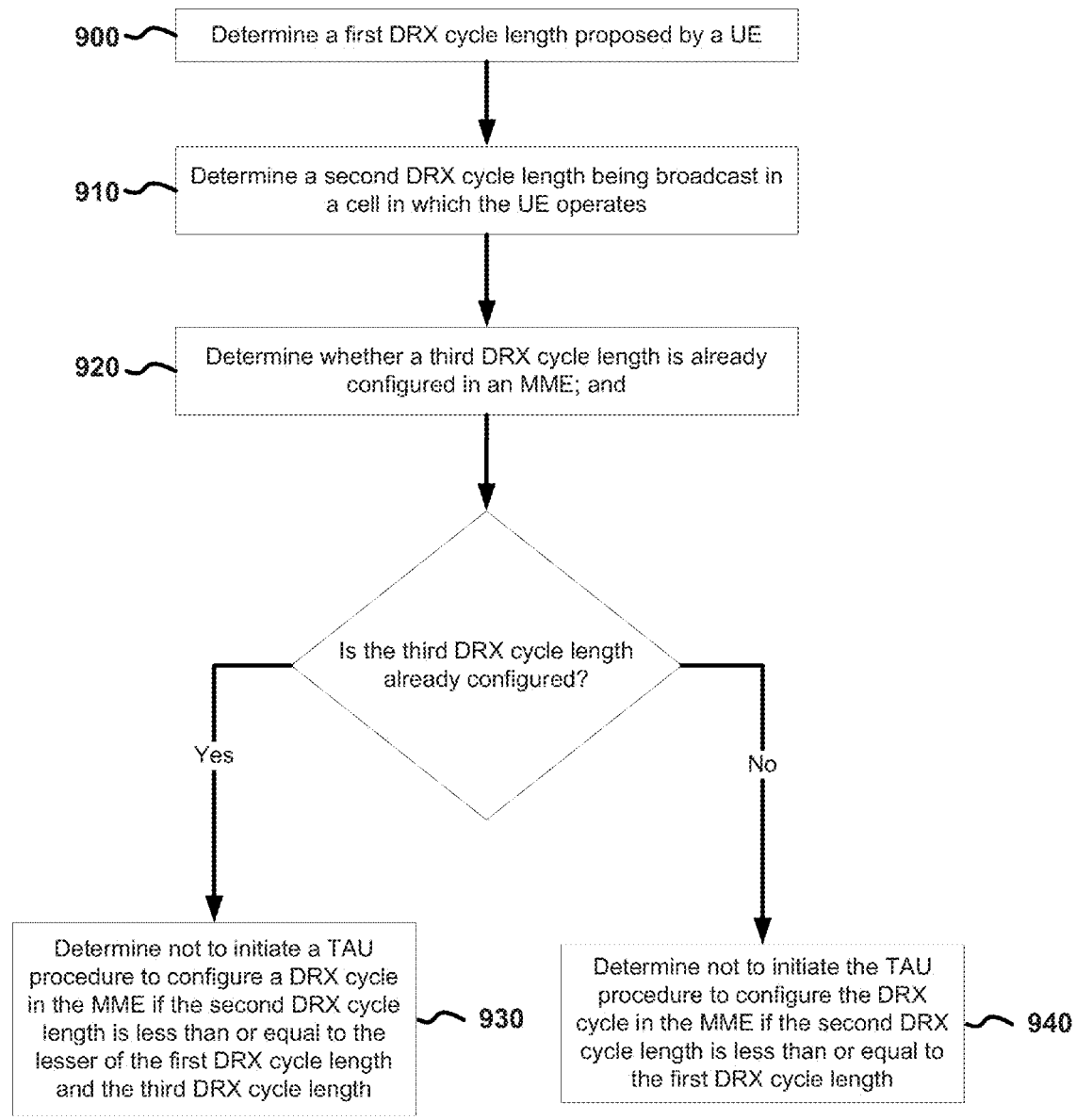
FIG. 9 illustrates example processes performed for determining whether a TAU procedure should be utilized to update a DRX cycle length in an MME in accordance with another embodiment.

FIG. 9 illustrates processes performed in accordance with another embodiment to determine whether or not a TAU procedure should be initiated to update a DRX cycle length configured in an MME. At 900, a first DRX cycle length proposed by a UE is determined. As previously described, a UE may select a UE-chosen DRX cycle length, and may wish to update the DRX cycle length currently configured in an MME with the UE-chosen DRX cycle length. At 910, a second DRX cycle length being broadcast in a cell in which the UE operates is determined. As also previously described, an eNB serving the cell in which the UE operates may be broadcasting a DRX cycle length in that cell. At 930, and if the third DRX cycle length is already configured, it is determined that a TAU to configure a DRX cycle in the MME should not be initiated if the second DRX cycle length is less than or equal to the lesser of the first DRX cycle length and the third DRX cycle length. At 940, and if the third DRX cycle length is not already configured, it is determined that the TAU to configure the DRX cycle in the MME should not be initiated if the second DRX cycle length is less than or equal to the first DRX cycle length. The third DRX cycle length, as previously discussed, may be the DRX cycle length that has already been configured in the MME (e.g., a previous UE-chosen DRX cycle length). It should be noted that in accordance with yet another embodiment, the process illustrated in FIG. 9 may be modified by simply determining a third DRX cycle length, where if not yet configured, the third DRX cycle length may be considered/assumed to be infinity/greater than the first DRX cycle length.

For example, the UE 112, may move from a first cell, e.g., Cell 1 served by eNB 114*a*, to a second cell, e.g., Cell 2 served by eNB 114*b*. While in Cell 1, the UE 112 may have performed a TAU procedure if, e.g., it selected a UE-chosen DRX cycle length (X2) that was less than the DRX cycle length being broadcast by the eNB 114*a* (X3). Thus, the MME 126 is configured with a DRX cycle having a DRX cycle length of X2. The eNB 114*b* may be broadcasting a different DRX cycle length (X1) in Cell 2, where the UE-chosen DRX cycle length X2 selected by the UE 112 in Cell 1 is now greater than the DRX cycle length X1 being broadcast by the eNB 114*b* in Cell 2. In this instance, the UE 112 need not initiate a TAU procedure to update the DRX cycle length configured in the MME 126. Furthermore, the UE 112 may again choose to change its UE-chosen DRX cycle length, this time to X1, now making this current UE-chosen DRX cycle length equal to that being broadcast by the eNB 114*b* in Cell 2. Because the DRX cycle length already configured in the MME 126 is greater than both the current UE-chosen DRX cycle length and the DRX cycle length being broadcast in Cell, which happen to be equal, a TAU procedure need not be initiated.

In accordance with various embodiments, power consumption in a UE may be reduced, not only due to the use of DRX, but by reducing the amount of TAUs that are initiated which require system resources to be utilized. Moreover, unnecessary signaling may be avoided between the UE and the MME. This may result in resource savings in the EPC, as well as reduce traffic in the EPC. As well, unnecessary signal may be avoided between the UE and the eNB, resulting in less traffic and savings in air resources.

Various embodiments have been described in the context of LTE networks and standards. However, it should be noted that the mechanisms described herein for reducing unnecessary signaling and use of resources may be applied to other types of communication networks that may employ DRX to reduce power consumption in devices that operate in such communication networks.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising, in a user equipment (UE):
determining two or more discontinuous reception (DRX) cycle lengths, including determining a first DRX cycle length being broadcast by a long term evolution based (LTE-based) evolved node B (eNB) in a cell and determining a second DRX cycle length proposed by the UE operating in the cell; and
determining to skip a tracking area update (TAU) procedure to configure a DRX cycle in a LTE-based mobility management entity (MME) if the first DRX cycle length being broadcast by the eNB is a lowest DRX cycle length among the two or more determined DRX cycle lengths, and to initiate the TAU procedure if the first DRX cycle length being broadcast by the eNB is greater than a lowest DRX cycle length among the two or more determined DRX cycle lengths.

2. The method of claim 1, wherein the two or more DRX cycle lengths consist of the first DRX cycle length, and the second DRX cycle length.

3. The method of claim 2 further comprising, initiating, by the UE, the TAU procedure to configure the DRX cycle in the MME based on the second DRX cycle length if the first DRX cycle length is greater than the second DRX cycle length.

4. The method of claim 1, wherein the two or more DRX cycle lengths consist of a third DRX cycle length configured in the MME, the first DRX cycle length, and the second DRX cycle length.

5. The method of claim 4 further comprising, initiating, by the UE, the TAU procedure to configure the DRX cycle in the MME based on the second DRX cycle length if the first DRX cycle length is greater than at least one of the second and third DRX cycle lengths.

6. The method of claim 5, wherein the initiating of the TAU procedure comprises sending, by the UE, a TAU request to the MME, the TAU request including the second DRX cycle length.

7. The method of claim 1 further comprising, re-evaluating, by the UE, the configuring of the DRX cycle in the MME when the UE determines a change in the first DRX cycle length prior to the sending of the TAU request to the MME.

8. The method of claim 7, wherein the changing of the first DRX cycle length is a result of a cell change or a change in broadcast information detected by the UE.

9. The method of claim 1 further comprising, re-evaluating, by the UE, the configuring of the DRX cycle in the MME when the UE changes the second DRX cycle length prior to the sending of the TAU request to the MME.

10. The method of claim 1 further comprising, including, by the UE, the second DRX cycle in the TAU procedure to configure the DRX cycle in the MME, regardless of the sizes of the first and second DRX cycle lengths, when the TAU procedure is initiated for a cause other than the configuring of the DRX cycle in the MME.

11. A method, comprising, in a user equipment (UE):
determining a first discontinuous reception (DRX) cycle length proposed by the UE;
determining a second DRX cycle length being broadcast by a long term evolution based (LTE-based) evolved node B (eNB) in a cell in which the UE operates;
determining whether a third DRX cycle length is already configured in a LTE-based mobility management entity (MME);
if the third DRX cycle length is already configured, determining to skip a tracking area update (TAU) procedure to configure a DRX cycle in the MME and determining to operate according to the second DRX cycle length being broadcast by the eNB, if the second DRX cycle length being broadcast by the eNB is less than or equal to the lesser of the first DRX cycle length and the third DRX cycle length, and to initiate the TAU procedure if the second DRX cycle length being broadcast by the eNB is not less than or equal to the lesser of the first DRX cycle length and the third DRX cycle length, and to initiate the TAU procedure if the second DRX cycle length being broadcast by the eNB is greater than the lesser of the first DRX cycle length and the third DRX cycle length; and
if the third DRX cycle length is not already configured, determining to skip the TAU procedure to configure the DRX cycle in the MME and determining to operate according to the second DRX cycle length being broadcast by the eNB, if the second DRX cycle length is less than or equal to the first DRX cycle length, and to initiate the TAU procedure if the second DRX cycle length is greater than the first DRX cycle length.

12. The method of claim 11 further comprising, re-evaluating, by the UE, the determination to skip the TAU procedure to configure the DRX cycle when the second DRX cycle length changes.

13. The method of claim 11 further comprising, re-evaluating, by the UE, the determination to skip the TAU procedure when the first DRX cycle length changes.

14. The method of claim 11 further comprising, if the third DRX cycle length is already configured, initiating, by the UE, the TAU procedure to configure the DRX cycle in the MME based on the first DRX cycle length if the second DRX cycle length is greater than at least one of the first DRX cycle length and the third DRX cycle length.

15. The method of claim 11 further comprising, indicating, by the UE, the first DRX cycle length to the MME in the TAU request regardless of the sizes of the first DRX cycle length, the second DRX cycle length, or the third DRX cycle length when the TAU procedure is initiated for a cause other than the configuring of the DRX cycle in the MME.

16. A method, comprising, in a user equipment (UE):
determining a first discontinuous reception (DRX) cycle length proposed by the UE;
determining a second DRX cycle length being broadcast by a long term evolution based (LTE-based) evolved node B (eNB) in a cell in which the UE operates;
determining a third DRX cycle length configured in a LTE-based mobility management entity (MME); and
making a decision to skip a tracking area update (TAU) procedure to update a DRX cycle in the MME and determining to operate according to the second DRX cycle length being broadcast by the eNB, if the second DRX cycle length is less than or equal to the lesser of the first DRX cycle length and the third DRX cycle length, and a decision to initiate the TAU procedure if the second DRX cycle length is greater than the lesser of the first DRX cycle length and the third DRX cycle length.

17. The method of claim 16 further comprising, initiating, by the UE, the TAU procedure to configure the DRX cycle in the MME if the first DRX cycle length is greater than at least one of the second and third DRX cycle lengths.

18. The method of claim 16 further comprising, re-evaluating, by the UE, the configuring of the DRX cycle in the MME when the first DRX cycle length changes.

19. The method of claim 16 further comprising, re-evaluating, by the UE, the configuring of the DRX cycle in the MME when the second DRX cycle length changes.

20. The method of claim 16 further comprising, including, by the UE, the first DRX cycle length in the TAU procedure to configure the DRX cycle in the MME, regardless of the sizes of the first and second DRX cycle lengths, when the TAU procedure is initiated for a cause other than the configuring of the DRX cycle in the MME.

* * * * *

UNITED STATES PATENT AND TRADEMARK OFFICE
CERTIFICATE OF CORRECTION

PATENT NO. : 9,179,407 B2  
APPLICATION NO. : 13/743218  
DATED : November 3, 2015  
INVENTOR(S) : Sushruth Nagaraj Donthi et al.

Page 1 of 1

It is certified that error appears in the above-identified patent and that said Letters Patent is hereby corrected as shown below:

In The Claims

Please replace column 15, line 64 through column 16, line 11 with the following corrected version:

if the third DRX cycle length is already configured, determining to skip a tracking area update (TAU) procedure to configure a DRX cycle in the MME and determining to operate according to the second DRX cycle length being broadcast by the eNB, if the second DRX cycle length being broadcast by the eNB is less than or equal to the lesser of the first DRX cycle length and the third DRX cycle length, and to initiate the TAU procedure if the second DRX cycle length being broadcast by the eNB is greater than the lesser of the first DRX cycle length and the third DRX cycle length; and Signed and Sealed this  
Nineteenth Day of April, 2016

Michelle K. Lee  
*Director of the United States Patent and Trademark Office*